United States Patent [19]

Burri

[11] Patent Number: 6,136,365
[45] Date of Patent: Oct. 24, 2000

[54] OAT CONTAINING CEREAL PRODUCTS

[75] Inventor: Josef Burri, Epalinges, Switzerland

[73] Assignee: Nestec S.A., Vevey, Switzerland

[21] Appl. No.: 09/226,247

[22] Filed: Jan. 7, 1999

[30] Foreign Application Priority Data

Oct. 2, 1998 [EP] European Pat. Off. ............ 98200407

[51] Int. Cl.$^7$ ............................ A23L 1/164; A23B 4/03; A23B 4/044
[52] U.S. Cl. ..................... 426/620; 426/619; 426/622; 426/457; 426/459; 426/462; 426/466; 426/508; 426/242
[58] Field of Search ..................... 426/456, 457, 426/459, 462, 465, 466, 508, 242, 619, 620, 622, 801

[56] References Cited

U.S. PATENT DOCUMENTS

| | | | |
|---|---|---|---|
| 3,494,769 | 2/1970 | Tressler | 99/83 |
| 3,962,462 | 6/1976 | Burkwall, Jr. et al. | 426/512 |
| 4,413,018 | 11/1983 | Webster | 426/618 |
| 4,734,294 | 3/1988 | Spiel et al. | 426/620 |
| 4,756,920 | 7/1988 | Willard | 426/549 |
| 4,957,762 | 9/1990 | Finnerty et al. | 426/457 |
| 4,978,543 | 12/1990 | Finnerty et al. | 426/243 |
| 5,024,145 | 6/1991 | Biley et al. | 99/451 |
| 5,198,255 | 3/1993 | Schwab et al. | 426/241 |
| 5,523,109 | 6/1996 | Hellweh et al. | 426/618 |

FOREIGN PATENT DOCUMENTS 0 672 353 A1  3/1995  European Pat. Off.
WO 95/33384  12/1995  WIPO.

OTHER PUBLICATIONS

Molteberg et al., "Effects of Storage and Heat Processing on the Content and Composition of Free Fatty Acids in Oats," *Cereal Chemistry*, vol. 72, No. 1, 88–93, 1995.

Molteberg et al., "Sensory and Chemical Studies of Lipid Oxidation in Raw and Heat-Treated Oat Flours," *Cereal Chemistry*, vol. 73, No. 5, 579–587, 1996.

Lehrack, U. and Volk, J, "New Possibilities for the Hydrothermal treatment of Cereals and Cereal Products", *Cereal and Bakery Products*, vol. 46, No. 9, 268–273, 1998. Abstract of International Food Information Service.

Primary Examiner—Nina Bhat
Attorney, Agent, or Firm—Pennie & Edmonds LLP

[57] ABSTRACT

A process for manufacturing an oat containing cereal product having an improved stability by heat treating a mixture comprising a pre-oxidized comminuted oat material at about 100 to 250° C. for about 2 sec to 60 min. Also provided is a process for preparing a comminuted oat material wherein the comminuted oat material is prepared by pre-oxidizing oat groats, bran, flakes or flour, especially dehulled, steamed and kilned oat groats, flakes or flour. The use of pre-oxidized comminuted oat material to produce an oat containing cereal product results in an oat containing cereal product having improved stability.

20 Claims, No Drawings

OAT CONTAINING CEREAL PRODUCTS

TECHNICAL FIELD

The present invention relates to a process for manufacturing an oat containing cereal product and a process for making an intermediate oat material.

BACKGROUND ART

Because of their relatively high fat and lipase content practically all oats for human consumption are traditionally submitted to a hydrothermal treatment which comprises dehulling, steaming and kilning.

Dehulling is generally carried out by an incomplete milling which provides dehulled oat groats and hulls. Steaming is generally carried out at a temperature from 90 to 100° C. in order to increase the moisture content of the groats from an initial water content of about 9 to 13% to about 18 to 20%. Kilning is often carried from the top of a high column to the bottom over a period of about 30 to 90 minutes. The upper half the high column is held at about 95 to 105° C. by dry indirect heating and vapour is drawn off from the lower part. The temperature of the groats in the lower part of the column is about 45 to 55° C. and their moisture content is about 10 to 14%. Often the kilned groats are rehumidified and flaked, the flakes may be further ground to flour.

The stability of the comminuted, intermediate oat material thus obtained, namely of the kilned oat groats, oat flakes or oat flour is dependent on this traditional hydrothermal treatment. However, oat containing cereal products obtained by a process in which such a traditional intermediate product is subjected to further heat treatment is are less stable. Thus a method of producing an intermediate oat material which improves the stability of an oat containing cereal product obtained therefrom is needed.

SUMMARY OF THE INVENTION

The present invention now provides a process for manufacturing an oat containing cereal product of improved stability. This process includes the steps of preparing a comminuted oat material by pre-oxidizing oat groats, bran, flakes or flour, especially dehulled, steamed and kilned oat groats, flakes or flour. The use of pre-oxidized comminuted oat material to produce an oat containing cereal product according to the process of the present invention results in an oat containing cereal product having improved stability. Thus the present invention is also directed to the resultant storage stable oat containing cereal product.

The process for manufacturing the oat containing cereal product comprises heat treating a cereal mixture containing a pre-oxidized comminuted oat material at temperature of about 100 to 250° C. for about 2 sec to 60 min. Preferably the comminuted oat material has a pregelatinization degree of from about 25 to 98% and more preferably from about 25 to 50%. The comminuted oat material is typically oat groats, bran, flakes, or flour. The mixture of comminuted oat material also may include water and sucrose.

The mixture of the pre-oxidized comminuted oat material may be heated by any means known in the art. Preferably the heat treating is carried out by steam cooking and roller drying, extrusion-cooking or cooking-puffing.

In a preferred embodiment of the process, the oat groats are dehulled, steamed and kilned prior to pre-oxidation. Preferably, the pre-oxidation treatment takes place at a temperature of about 120° C. or higher for about 2 to 45 min. Most preferably, the oxidation takes place at a temperature of about 120° C. to 135° C. In an alternative embodiment of the invention the dehulled, steamed and kilned oat groats, flakes or flour are pre-oxidized by being stored at a temperature of about 20 to 40° C. for about 1 to 12 months. In another embodiment of the present invention, the oat groats, bran or flour is pre-oxidized by heat treating with superheated steam or microwaves.

The present invention is also directed to the resultant storage stable oat containing cereal. Preferably the storage stable oat containing cereal has a residual moisture content of from about 1 to 10%. The storage stable oat containing cereal is preferably prepared by the previously described processes.

DETAILED DESCRIPTION OF THE PREFERRED EMBODIMENTS

We have noticed that a comminuted oat material having a good stability as a result of traditional hydrothermal treatment is surprisingly not as adequate for manufacturing a stable oat containing cereal product as is a comminuted intermediate product according to the present invention.

Surprisingly, a pre-oxidized comminuted oat product, especially a product having been submitted to a relatively strong hydrothermal treatment resulting in a relatively high gelatinization degree, indeed appears to be more adequate for manufacturing an oat containing cereal product with improved stability.

Without wishing to be bound by any particular theory, a tentative hypothesis for explaining this very surprising result is that further heat treatment used in manufacturing the cereal end product leads to their instability. While non pre-oxidized, traditional, intermediate products may keep well, the cereal end products containing them do not due to the oxidizing effect of the further heat treatment used in manufacturing the cereal end products. On the contrary, while pre-oxidized intermediate products according to the present invention may not keep well, the end products containing them will, most likely due to steam stripping of the already formed oxidation products, quenching of free radicals or formation of few additional pro-oxidant compounds.

Thus, using a higher temperature during a hydrothermal treatment of oat grains may lead to a pre-oxidation by, for example, inactivating naturally present antioxidants such as tocopherols or tocotrienols, formation of pro-oxidants, or disintegration of fat globules which allows free access to oxygen.

We have noticed a similar effect in the stability of cereal end products which are dependent on the storage conditions of the intermediate oat products. Cereal end products produced from intermediate oat products that have been stored at moderate temperature for long duration exhibit improved stability compared to cereal end products prepared from intermediate oat products that have been stored at lower temperatures. For example, keeping comminuted oat products at a moderate storage temperature of about 20° to 40° C., instead of a low storage temperature of from about −20 to +5° C., for a long period of time of about 1 to 12 months surprisingly resulted in the cereal end products containing the intermediate oat products having increased stability. Thus, moderate temperature and high duration storage has the same surprising effect as the high temperature moderate time treatment discussed above.

Thus, the process for manufacturing an oat containing cereal product according to the present invention comprises heat treating at about 100 to 250° C. for about 2 sec to 60 min a mixture comprising a pre-oxidized comminuted oat material.

The process for preparing the comminuted oat material according to the present invention comprises pre-oxidizing oat groats, bran, flakes or flour, especially dehulled, steamed and kilned oat groats, flakes or flour.

Pre-oxidation may be carried out either by using a temperature of about 120° C. or higher for about 2 to 45 min during kilning or by storing the oat groats, bran, flakes or flour at about 20 to 40° C. for about 1 to 12 months. It is especially preferable that the oat groats, flakes or flour obtained after kilning having a pregelatinization degree of from about 25 to 98%. Pre-oxidizing may also be carried out by heat treating oat groats, bran or flour, with superheated steam or by microwaves.

To implement the present process for manufacturing an oat containing cereal product, a mixture is prepared which beside the pre-oxidized comminuted oat material preferably comprises water and optionally sucrose. The mixture may have a water content of from about 10 to 70% by weight of which up to about 65% may be added water. Besides added water, the mixture may comprise, in parts by weight, up to 100 parts, preferably from about 10 to 100 parts of pre-oxidized comminuted oat material, up to 20 parts, preferably from about 10 to 20 parts of sucrose, and up to about 90 parts, preferably from about 10 to 90 parts of cereal material which is different from oat, such as wheat, for example. Further components of the mixture may be skimmed milk powder, cocoa powder or any other protein rich or aroma rich component obtained from but not limited to fruits, vegetables, tubers or roots.

Heat treating may be carried out by cooking. Preferred methods of cooking are steam injection cooking and roller drying the mixture in the form of a slurry, extrusion-cooking or cooking-puffing a mixture in the form of a dough. The heat treated product is preferably dried to a residual moisture content of from 1 to 10%.

Oat containing cereal products which may be manufactured in this way from pre-oxidized groats, flakes, flour, bran or bran concentrate include, but are not limited to, breakfast cereals, infant cereals, and dietetic products for adults. The oat containing cereal products can be prepared from pre-oxidized groats, flakes, flour, bran or bran concentrate and the like.

To implement the present process for preparing a comminuted oat material, pre-oxidizing oat groats, bran, flakes or flour may be carried out in a variety of ways.

In a preferred embodiment of the process, pre-oxidizing dehulled, steamed and kilned oat groats, flakes or flour is carried out by using a temperature of about 120° C. or higher, preferably of from about 120 to 135° C. for about 2 to 45 min during kilning. It is preferable that the comminuted oat material have a pregelatinization degree of from about 25 to 98%, preferably of from about 25 to 50%, after kilning. In another preferred embodiment of the invention the pre-oxidizing dehulled, steamed and kilned oat groats, flakes or flour is carried out by storing the oat groats, flakes or flour at about 20 to 40° C. for about 1 to 12 months. In these preferred embodiments, except for the pre-oxidizing step, the comminuted material may be prepared as disclosed above for the traditional process of dehulling, steaming and kilning.

In another embodiment of the invention pre-oxidation is carried out by heat treating oat groats, bran or flour, by superheated steam or by microwaves. In these embodiments, the oat grains may be dehulled by an incomplete milling which provides dehulled oat groats and hulls. The groats may be further comminuted to flour either before or after having been treated. The heat treatment may be carried out at a temperature of about 125° C. or higher, preferably from about about 125 to 180° C. for about 10 sec to 5 min. When heat treatment is carried out with superheated steam, it is preferably carried out so that the degree of gelatinization in the comminuted material is from about 25 to 98% and most preferably from about 25 to 50%.

EXAMPLES

The following preferred but non-limiting examples illustrate the products and intermediate products of the present invention and processes for manufacturing and preparing them. In these examples the parts and percentages are by weight, except where otherwise indicated.

Example 1

Australian oat grains having a moisture content of 10.4% and a fat content of 8.7% were dehulled by an incomplete milling which provided dehulled oat groats. The groats were steamed at 95° C. to increase their moisture content to about 18 to 20%. The steamed groats were introduced into the upper end of a kiln which was a column capable of holding one ton of groats. The temperature in the upper half of the kiln was held at 130° C. by dry indirect heating. Vapour was drawn off from the lower part of the kiln. In the lower part of the kiln the temperature of the groats dropped to about 50° C., their moisture content was about 10% and their gelatinization degree was about 90%. The whole kilning step lasted for about 45 min.

For comparison a sample of the kilned groats were stored at 37° C. for 4 months in tightly sealed metal tins. After 4 months storage the oxidation level was measured by head space analysis (pentane; the more pentane in the head space, the higher the oxidation level). The head space was found to contain 260 ppm of pentane.

An oat containing cereal product was manufactured from the kiln dried oats by preparing a mixture containing 65% water and 35% dry matter. The dry matter consisted of 85% kilned groats and 15% sucrose. The mixture was cooked by steam injection at 125° C. for 30 s and roller dried at 160° C. to a residual water content of 2.5%. The dried film scraped from the roller was broken into pieces which represented the end product, namely infant cereal.

The infant cereal was stored at 37° C. for 4 months in tightly sealed metal tins. After 4 months storage the oxidation level was measured by head space analysis. The head space was found to contain 25 ppm of pentane.

Comparative Example C1

A process for preparing kilned oat groats was carried out as disclosed in Example 1 except that the temperature in the upper half of the kiln was held at 90° C. instead of 130° C. The kilned groats had a gelatinization degree of about 20%.

For comparison a sample of the kilned groats was stored at 37° C. for 4 months in tightly sealed metal tins. After 4 months storage the oxidation level was measured by head space analysis. The head space was found to contain 30 ppm of pentane.

An oat containing cereal product was manufactured according to the process disclosed in Example 1 except that the kilned groats of the present comparative Example C1 were used.

The dried film scraped from the roller was broken into pieces and stored at 37° C. for 4 months in tightly sealed metal tins. The oxidation level was measured by head space analysis. The head space was found to contain 270 ppm of pentane.

The above example illustrates that while kiln dried groats pre-oxidized according to the present invention are less stable than non pre-oxidized kiln dried groats the cereal end products produced from the pre-oxidized kiln dried groats are more stable than cereal end products produced from the non pre-oxidized kiln dried groats.

Example 2

German oat grains having a moisture content of 11.5% and a fat content of 6.2% were dehulled by an incomplete milling which provided dehulled oat groats. The groats were heat treated by microwave at 132° C. for 2 min.

The microwaved groats were stored at 37° C. for 4 months in tightly sealed metal tins. After 4 months storage the oxidation level was measured by head space analysis (pentane, oxygen; the less residual oxygen, the higher the oxidation level). The head space was found to contain about 100 ppm of pentane and essentially no residual oxygen.

Comparative Example C2

The same oat grains as disclosed in Example 2 were dehulled by an incomplete milling which provided dehulled oat groats. The groats were heat treated by microwave for 2 min at 120° C. instead of 132° C.

The microwaved groats were stored at 37° C. for 4 months in tightly sealed metal tins. The oxidation level was measured by head space analysis. The head space was found to contain about 1 ppm of pentane and about 21% of residual oxygen, which essentially corresponds to the maximum amount of residual oxygen possible.

The above example illustrates that kiln dried groats pre-oxidized according to the present invention are less stable than non pre-oxidized kiln dried groats.

Example 3

French oat grains having a moisture content of 9.5% and a fat content of 10.9% were dehulled by an incomplete milling which provided dehulled oat groats.

The initial moisture content of the groats was increased to 17% by soaking in water. The groats were then heat treated for 18 s with a superheated steam having a temperature of 170° C. and an absolute pressure of 1.1 bar. The heat treated groats had a degree of gelatinization of 33%.

For comparison a sample of the heat treated groats were stored at 37° C. for 4 months in tightly sealed metal tins. After 4 months storage the oxidation level was measured by head space analysis. The head space was found to contain 78 ppm of pentane.

An oat containing cereal product was manufactured from the heat treated groats by preparing a mixture containing 65% water and 35% dry matter. The dry matter consisted of 85% heat treated groats and 15% sucrose. The mixture was cooked by steam injection at 125° C. for 30 s and roller dried at 160° C. to a residual water content of 2.5%. The dried film scraped from the roller was broken into pieces which represented the end product, namely infant cereal.

The infant cereal was stored at 37° C. for 4 months in tightly sealed metal tins. After 4 months storage the oxidation level was measured by head space analysis. The head space was found to contain 17 ppm of pentane.

The above example illustrates that while heat treated groats pre-oxidized according to the present invention are susceptible to oxidation, cereal end products produced from the pre-oxidized heat treated groats according to the present invention are less susceptible to oxidation.

Example 4

A traditional oat flour having a moisture content of 10% was bought in a fresh state on the market and stored at 20° C. for 4 months.

An oat containing cereal product was manufactured from the fresh oat flour by preparing a mixture containing 65% water and 35% dry matter. The dry matter consisted of 85% fresh oat flour and 15% sucrose.

The mixture was cooked by steam injection at 125° C. for 30 s and roller dried at 160° C. to a residual water content of 2.5%. The dried film scraped from the roller was broken into pieces which represented the end product, namely infant cereal.

The infant cereal was stored at 37° C. for 4 months in tightly sealed metal tins. After 4 months storage the oxidation level was measured by head space analysis. The head space was found to contain 15 ppm of pentane.

Comparative Example C4

The same traditional oat flour as in Example 4, bought in a fresh state on the market and having a moisture content of 10%, was stored at −20° C. for 4 months.

Two batches of infant cereal was manufactured according to the process disclosed in Example 4. One batch of infant cereal was manufactured using the flour stored at −20° C., instead of +20° C., and the second batch of infant cereal was manufactured using flour in the fresh state.

The infant cereals were stored at 37° C. for 4 months in tightly sealed metal tins. After 4 months storage the oxidation level was measured by head space analysis. The head space was found to contain 23 ppm of pentane for the infant cereals of the first batch (flour stored at −20° C.) and 33 pm for the infant cereals of the second batch (fresh flour).

The above example illustrates that cereal end products produced by heat treating pre-oxidized flour according to the present invention are more stable than cereal end products produced from non pre-oxidized flour.

What is claimed is:

1. A process for manufacturing an oat containing cereal product, which comprises heat treating a cereal mixture that contains a pre-oxidized comminuted oat material at a temperature of about 100 to 250° C. for about 2 sec to 60 min.

2. The process according to claim 1, wherein the comminuted oat material has a pregelatinization degree of from about 25 to 98%.

3. The process according to claim 2, wherein the comminuted oat material has a pregelatinization degree of from about 25 to 50%.

4. The process according to claim 1, wherein the comminuted oat material is in the form of oat groats, bran, flakes, or flour.

5. The process according to claim 1, wherein the mixture further comprises water, optionally with sucrose and a cereal material which is different than the oat material, in amounts sufficient to provide about 10 to 100 parts of pre-oxidized comminuted oat material, up to about 20 parts of sucrose, and up to about 90 parts of the different cereal material.

6. The process according to claim 1, wherein the mixture further comprises water, sucrose and a cereal material which is different than the oat material, in amounts sufficient to provide from about 10 to 100 parts of pre-oxidized comminuted oat material, from about 10 to 20 parts of sucrose, and from about 10 to 90 parts of the different cereal material.

7. The process of claim 1, wherein the heat treating is carried out by one of steam cooking and roller drying, extrusion-cooking or cooking-puffing.

8. A process for preparing a comminuted oat material, which comprises pre-oxidizing an oat material comprising oat groats, bran, flakes, or flour and comminuting the oat material to form a pre-oxidized comminuted oat material.

9. The process according to claim 8, which further comprises dehulling, steaming and kilning the oat material prior to pre-oxidizing at a temperature of about 120° C. or higher for about 2 to 45 min.

10. The process according to claim 9, wherein the dehulled, steamed and kilned oat groats, flakes or flour are pre-oxidized at a temperature of about 120° C. to 135° C.

11. The process according to claim 8, wherein the comminuted oat material has a pregelatinization degree of about 25 to 98%.

12. The process according to claim 11, wherein the comminuted oat material has a pregelatinization degree of about 25 to 50%.

13. The process according to claim 8, which further comprises dehulling, steaming and kilning the oat material prior to pre-oxidizing by storing them at about 20 to 40° C. for about 1 to 12 months.

14. The process according to claim 8, wherein the oat groats, bran or flour is pre-oxidized by heat treating with superheated steam.

15. The process according to claim 8, wherein the oat groats, bran or flour is pre-oxidized by heat treating with microwaves.

16. The process according to claim 8, wherein the pre-oxidized comminuted oat material is combined in a cereal mixture for use in the preparation of an oat containing cereal product.

17. A storage stable oat containing cereal product obtained by the process of claim 1 and having a residual moisture content of from about 1 to 10%.

18. A storage stable oat containing cereal product obtained by the process of claim 16 and having a residual moisture content of from about 1 to 10%.

19. A storage stable oat containing cereal product comprising a pre-oxidized comminuted oat material and having a moisture content of from about 1 to 10%.

20. The process of claim 1, wherein the oat material is pre-oxidized by heating at a temperature of about 120° C. to 135° C. or by storing the oat material at about 20° C. to 40° C. for about 1 to 12 months.

* * * * *